(12) United States Patent
Suits et al.

(10) Patent No.: US 11,274,965 B2
(45) Date of Patent: Mar. 15, 2022

(54) NOISE MODEL-BASED CONVERTER WITH SIGNAL STEPS BASED ON UNCERTAINTY

(71) Applicant: International Business Machines Corporation, Armonk, NY (US)

(72) Inventors: Frank Suits, Brighton (AU); Filiz Isabell Kiral, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 291 days.

(21) Appl. No.: 16/785,971

(22) Filed: Feb. 10, 2020

(65) Prior Publication Data

US 2021/0247230 A1    Aug. 12, 2021

(51) Int. Cl.
*G01J 1/44* (2006.01)
*G06F 9/30* (2018.01)

(52) U.S. Cl.
CPC ............. *G01J 1/44* (2013.01); *G06F 9/30145* (2013.01); *G01J 2001/444* (2013.01); *G01J 2001/448* (2013.01)

(58) Field of Classification Search
CPC .. G01J 1/44; G01J 2001/444; G01J 2001/448; G06F 9/30145; G06K 9/00503; G06K 9/40; G01D 3/022; G06T 5/002
See application file for complete search history.

(56) References Cited

U.S. PATENT DOCUMENTS

| | | | |
|---|---|---|---|
| 5,812,672 A | 9/1998 | Herre et al. | |
| 7,830,429 B1 | 11/2010 | Dicarlo | |
| 8,131,544 B2 | 3/2012 | Herbig et al. | |
| 10,262,401 B2 | 4/2019 | Smirnov et al. | |
| 10,269,095 B2 | 4/2019 | Lim et al. | |
| 2009/0324117 A1* | 12/2009 | Demandolx | G06K 9/40 382/254 |
| 2011/0238416 A1* | 9/2011 | Seltzer | G10L 15/20 704/233 |
| 2019/0124454 A1 | 4/2019 | Aschbacher et al. | |

FOREIGN PATENT DOCUMENTS

EP    3062126 A1    8/2016

OTHER PUBLICATIONS

Boyat, et al., "A Review Paper: Noise Models in Digital Image Processing," Signal & Image Processing: An International Journal (SIPIJ) vol. 6, No. 2, Apr. 2015; (13 pages).

* cited by examiner

*Primary Examiner* — Thanh Luu
*Assistant Examiner* — Monica T Taba
(74) *Attorney, Agent, or Firm* — Cantor Colburn LLP; Joseph Petrokaitis

(57) ABSTRACT

Embodiments of the present invention are directed to a noise-model based sensor converter configured to map a sensor measurement output to discrete, nonlinear steps of constant uncertainty. In a non-limiting embodiment of the invention, the sensor converter receives an output signal from a sensor. The output signal can include a measurement. The sensor converter can also receive a noise model. The output signal is mapped to a discrete set of steps based on the noise model. The discrete set of steps are nonlinearly spaced to provide constant uncertainty between adjacent steps. The sensor converter generates an output based on the discrete set of steps.

20 Claims, 9 Drawing Sheets

NOISE MODEL-BASED CONVERTER WITH SIGNAL STEPS BASED ON UNCERTAINTY

BACKGROUND

The present invention generally relates to computer systems, and more particularly, to a computer system configured with a noise model to record or represent a signal with configurable steps based on uncertainty as determined by the noise model.

A sensor is a device, module, machine, or subsystem that detects events or changes in its environment. Typically, a sensor converts the detected change to information/data and sends the information/data representing the detected change to other electronics, such as a computer processor, which may or may not take some action or otherwise generate a response based on the information received. A simple example of a sensor combined with a computer-based controller is a thermometer. With advances in micromachinery and easy-to-use microcontroller platforms, the uses of sensors have expanded beyond the traditional fields of temperature, pressure, flow measurements, and electrical and magnetic fields such as EEG (electroencephalogram) or MRI (magnetic resonance imaging). Sensors are now configured for a huge variety of applications, for example, as acoustic sensors, imaging sensors, chemical sensors, radiation sensors, optical sensors, proximity sensors, and speed sensors, among others.

The presence of noise in sensor measurements introduces uncertainty in the accuracy of the sensor output. Noise refers generally to the undesirable, and often unknown, modifications to a measurable phenomenon in a reported signal that can occur during the capture, storage, transmission, processing, or conversion of a measurement value of the phenomenon. Noise can cause a range of undesirable results, depending on the particular application. For example, in image processing, image noise refers to random variations of brightness or color information in an image. These variations are sometimes referred to as image artifacts. In another example, audio noise can manifest as an unwanted hiss or hum in an audio signal.

In some applications, especially those applications where accuracy is critical, large differences between the true value being measured and the signal value reported by the sensor can be problematic. Consequently, it is desirable to quantify the relationship between noise and a reported signal. Often there is a formula to estimate the amount of noise present in a given measurement or part of a system, referred to as a noise model.

SUMMARY

Embodiments of the invention are directed to a computer-implemented method for mapping a sensor measurement output to discrete, nonlinear steps of configurable uncertainty. A non-limiting example of the method includes receiving, by a sensor converter, an output signal from a sensor. The output signal can include a measurement. The sensor converter can also be configured with a noise model that can be provided by the sensor or otherwise loaded onto the converter. The method can include mapping the output signal to a discrete set of steps based on the noise model. The discrete set of steps can be nonlinearly spaced to provide a configurable amount of statistical uncertainty between adjacent steps. The method can include generating an output based on the discrete set of steps.

Embodiments of the invention are directed to a processing system for mapping a sensor measurement output to discrete, nonlinear steps based on uncertainty as defined by the noise model. The steps could be of constant uncertainty or they could follow a formula that causes the steps in increase or decrease the uncertainty between them with increasing signal. A non-limiting example of the system includes an instruction fetch/decode unit operable to fetch and decode a plurality of instructions having at least one instruction to perform a discretization operation. The system further includes a dispatch/issue unit operable to dispatch the instructions to an issue queue after decoding. The system further includes a discretization module communicatively coupled to the issue queue. The discretization module can be configured to perform a plurality of operations. The operations can include receiving an output signal from a sensor. The output signal can include a measurement. The operations can further include receiving a noise model of the sensor and mapping, based on the noise model, the output signal to a discrete set of steps. The discrete set of steps are nonlinearly spaced to provide the desired statistical uncertainty between adjacent steps. The operations can also include generating an output based on the discrete set of steps.

Embodiments of the invention are directed to a computer program product for mapping a sensor measurement output to discrete, nonlinear steps of desired uncertainty. A non-limiting example of the computer program product includes a computer readable storage medium having program instructions embodied therewith, the program instructions executable by processing circuitry to perform a plurality of operations. The operations include receiving an output signal from a sensor. The output signal can include a measurement. The operations further include receiving a noise model of the sensor and mapping, based on the noise model, the output signal to a discrete set of steps. The discrete set of steps can be nonlinearly spaced to provide constant statistical uncertainty between adjacent steps, or spaced such that the amount of uncertainty changes (increases or decreases) between successive steps. The operations can also include generating an output based on the discrete set of steps.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
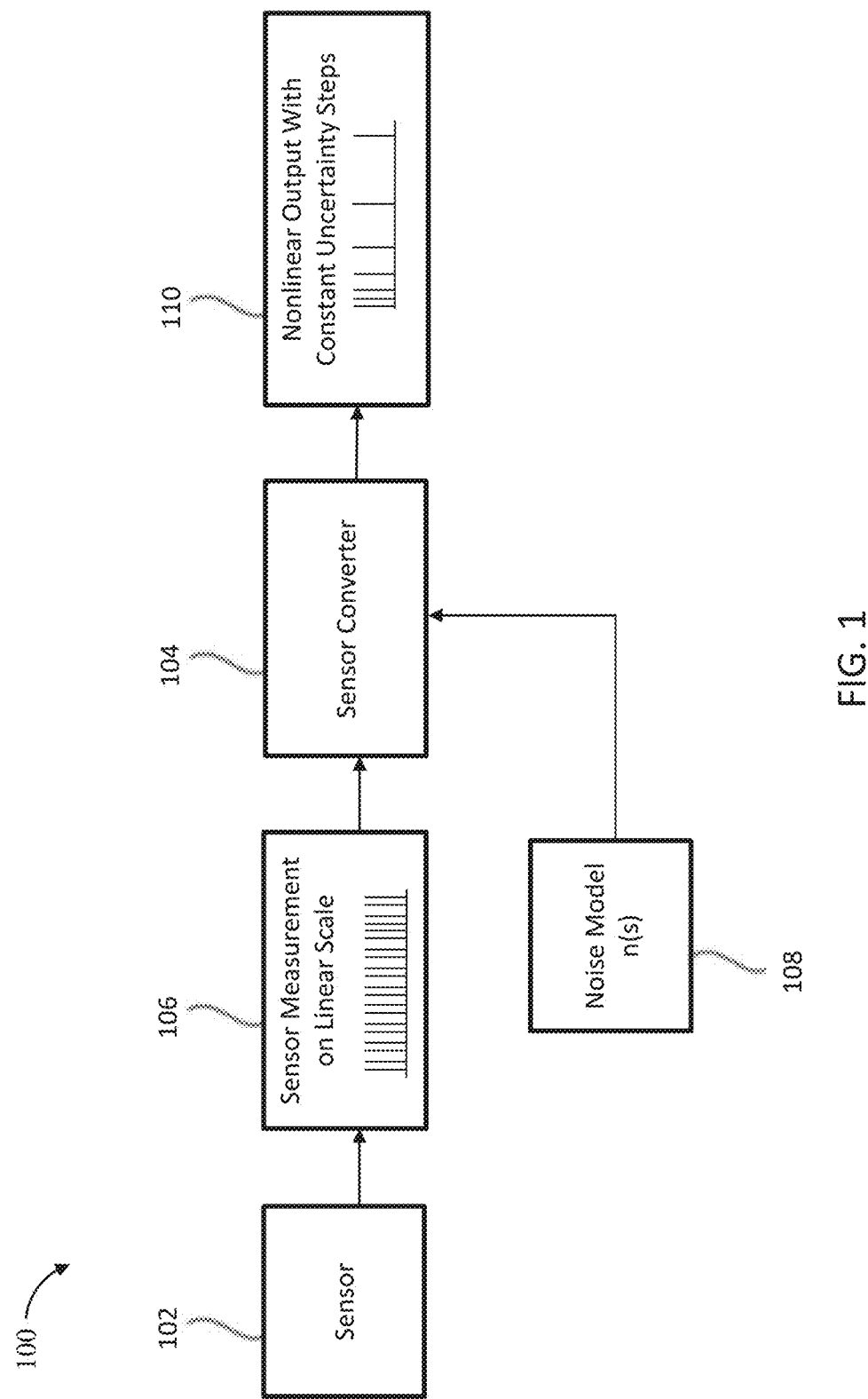
FIG. 1 is a block diagram illustrating a processing system configured to convert a sensor measurement to a nonlinear output having constant uncertainty steps in accordance with various embodiments of the invention.

The diagrams depicted herein are illustrative. There can be many variations to the diagrams or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

It is understood in advance that although example embodiments of the invention are described in connection with a particular system architecture, embodiments of the invention are not limited to the particular architectures or materials described in this specification. Rather, embodiments of the present invention are capable of being implemented in conjunction with other processor architectures now known or later developed.

For the sake of brevity, conventional techniques related to making and using aspects of the invention may or may not be described in detail herein. In particular various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the present invention, noise models can be constructed for a particular sensor to estimate the amount of noise present in a given measurement. In other words, noise models can be used to estimate the uncertainty in a reported measurement. Known noise models are highly nonlinear—which means that the uncertainty itself can depend strongly on the signal strength of the measurement. This is referred to herein as the so-called measurement issue. Unfortunately, this changing uncertainty is not conveyed if the measurements are recorded on a fine, linear scale as is usually done.

Turning now to an overview of aspects of the present invention, one or more embodiments of the invention address the above-described shortcomings of the prior art by providing a noise-model sensor converter with configurable uncertainty steps. More specifically, the present noise-model sensor converter receives a noise model (e.g. for a sensor or an external device) and maps the output measurement to a discrete set of steps optimized to have configurable uncertainty between them, one example being steps of constant uncertainty. As used herein, "constant uncertainty" means that a change in a reported measurement value by one step up or down will always have the same statistical significance regardless of the signal strength. In other words, if a sensor value drifts up or down at any signal level, the changes will be equally statistically significant (within one standard deviation, within two, etc.)—which is not possible using standard nonlinear mappings.

While there are many standard forms of nonlinear mappings, such as logarithmic or decibel scales, these mappings are mathematical constructs that are independent of the sensor itself. In other words, conventional nonlinear mappings are not based specifically on a noise model of a sensor and none of these conventional mappings directly address the measurement issue. Advantageously, this noise-model sensor converter can allow a sensor to output measurements on a scale with steps that are at a specified amount of uncertainty in a way that is specific to the noise model of the device.

Applications for a noise-model sensor converter constructed to provide configurable uncertainty steps span across multiple domains—from single sensor measurements of values such as temperature or length, to imaging sensors and systems involving measurements of high dimension. This noise-model sensor converter also enables data compression of a new form (constant uncertainty steps)—and allows for more interpretable indications of changes in a measurement—since each step has known significance. Moreover, while there are many ways that a measurement can be filtered, the present approach enables discretizing the output of a sensor so that any changes indicated have known statistical significance and are not simply random fluctuations.

Moreover, the use of a noise-model sensor converter configured as described herein to map output measurements to a discrete set of steps optimized to have configurable uncertainty is not limited to sensors. For example, the described techniques (mapping outputs based on configurable uncertainty) can be leveraged against an overall acquisition system that includes a sensor converter, but also the source of the signal itself if it has known properties with regards to uncertainty (e.g. clipping of an amplifier). In this manner, the noise model can capture any number of processing steps in an acquisition system. Consequently, the described techniques can be used to model other known linear or non-linear influences (in addition or in lieu of sensor noise), for example signal saturation.

One or more embodiments of the present invention provide technological improvements over conventional noise-model based sensors having nonlinear mappings. As discussed previously, while there are many forms of nonlinear alterations of a signal for various purposes, current nonlinear mappings are independent of the particular sensor used and the respective sensor noise model. Conversely, the present sensor converter bases the nonlinearity on the specific noise model of the sensor—and thereby to output values that are "equally distinct" from each other in terms of noise overlap and uncertainty—in the case of constant uncertainty steps.

In other words, the present sensor converter maps an output measurement to a discrete set of steps optimized to have constant uncertainty between them. Nonlinear mappings having constant uncertainty can be used to improve a wide variety of applications, for example, to enable an entirely new type of data compression scheme based on constant uncertainty steps.

Referring now to FIG. 1, a block diagram is shown illustrating a processing system 100 configured to convert a sensor measurement to a nonlinear output having constant uncertainty steps in accordance with one or more embodiments of the present invention. As shown in FIG. 1, the processing system 100 can include a sensor 102 and a sensor converter 104 (sometimes referred to as a "discretization device").

The sensor 102 can include any type of analogue or digital sensor, for example, acoustic sensors, chemical sensors, electric current sensors, electric potential sensors, magnetic sensors, temperature sensors, pressure sensors, moisture sensors, flow sensors, radiation sensors, optical sensors, force sensors, thermal sensors, proximity sensors, imaging sensors, any other type of sensor, and combinations thereof. In some embodiments of the invention, the sensor 102 can be configured to generate a sensor measurement 106. In some embodiments of the invention, the sensor measurement 106 is generated on a linear scale. In some embodiments of the invention, the output of the sensor 102 (i.e., the sensor measurement 106) is coupled to an input of the sensor converter 104. In this manner, the sensor measurement 106 can be received as an input to the sensor converter 104.

As shown in FIG. 1, the sensor converter 104 can also receive a noise model 108 (sometimes denoted as n(s)) as an additional input. In some embodiments of the invention, the noise model 108 is a known noise model associated with the particular sensor 102. For example, given a sensor device that generates an output signal, s, in combination with noise, n, there is often a known noise model associated with the sensor that is signal-dependent, where noise=n(s). In some embodiments of the invention, n(s) represents the noise or uncertainty, as a standard deviation, of measuring the signal value, s. In that case, two measurements near each other in value can be inherently indistinguishable if the noise is large at that signal value; or they can remain completely distinct if the noise is small. As discussed previously herein, noise is inherently unpredictable and determining whether two measurements are actually distinct becomes extremely difficult using conventional noise models.

In some embodiments of the invention, the noise model 108 is a one-dimensional, highly non-linear noise model, although other noise model configurations are within the contemplated scope of the invention. In some embodiments of the invention, the noise model 108 is sensor-specific.

In some embodiments of the invention, the sensor converter 104 includes a user interface (not depicted) for configuring the noise model 108. In some embodiments of the invention, the user interface is configured such that the user can enter (upload, configure, or select from a list of preconfigured noise models) a custom noise model. In this manner, a user can use the user interface to program the sensor converter 104 with the noise model 108. In some embodiments of the invention, the sensor converter 104 includes a memory 202 (FIG. 2) for storing one or more preconfigured noise models. In some embodiments of the invention, a user can use the user interface to select a preconfigured noise model.

In some embodiments of the invention, the sensor converter 104 determines a nonlinear output 110 having constant uncertainty steps based on the sensor measurement 106 and the noise model 108. In some embodiments of the invention, the sensor converter 104 discretizes the sensor measurement 106 (i.e., signal) into nonlinear steps based on the specific noise model 108 to generate the nonlinear output 110.

In some embodiments of the invention, the nonlinear steps of the nonlinear output 110 can be calculated directly from the noise model 108. In some embodiments of the invention, the nonlinear steps are determined iteratively. For example, if the noise "n" as a function of signal "s" is n=n(s), then the kth step in the signal value can be found via the following iteration:

$s_0 = s_{min}$ $s_1 = s_0 + f\, n(s_0)$ $s_2 = s_1 + f\, n(s_1)$ $\vdots$ $s_N = s_{N-1} + f\, n(s_{N-1})$ Or in pseudocode:

$s = s_{min}$

Repeat $k$ times: $s = s + f*\mathrm{noise}(s)$

Here, f specifies how densely the signal is discretized, and a value of 1 will set the steps one standard deviation from each other in terms of uncertainty (noise) in the signal measurement. The result of this pseudocode is that, for each iteration, the next step (N) is the previous step (N−1) plus f times the noise at the previous step. Advantageously, given a signal "s" the corresponding "k" value on the discretized scale can be identified and assigned the nearest value.

In some embodiments of the invention, the nonlinear steps are determined via direct integration of the noise model 108. For example, if the noise "n" as a function of signal "s" is n=n(s), then the nonlinear steps can be specified based on the noise model 108 through the following equation:

$$\int_{s_{min}}^{s_k} \frac{ds'}{n(s')} = fk. \qquad (1)$$

Equation (1) shows that the integral of the reciprocal of the noise model, up to the kth step value, will be k times the space factor, f. Some noise models can be integrated directly, allowing an explicit expression for the step values, s(k) by solving the integral and expressing s(k) as a function of k, f and $s_{min}$. Alternatively, in some embodiments of the invention, the integral can be performed numerically. Both the iterative method and the integral form will provide nonlinear steps of the desired spacing (i.e., as defined by the spacing factor "f").

The determination of a nonlinear output having constant uncertainty steps based on a noise model is illustrated below with respect to two examples.

Example 1: Noise is Linear with Signal

A simple form of noise is linear with signal but not quite going to 0 when signal is 0. This could correspond, for example, to a thermometer that can measure accurately at low temperature, but where the error increases with temperature. Such a noise model can be represented as:

$$n(s)=\alpha s+\beta$$

Here, α and β are the coefficients for the slope (α) and intercept (β) of the noise model n(s). In that case the integral defined in equation (1) yields discrete steps based on:

$$s_k=\beta(e^{\alpha fk}-1)$$

Notably, this means that when the noise is linear with the signal, the discrete steps of equally spaced uncertainty will follow an exponential trend.

Example 2: CCD Imaging Sensor

In some embodiments of the invention, the sensor 102 is a charge-coupled device (CCD) imaging sensor with a known noise model 108. In some embodiments of the invention, the noise includes read noise in each pixel, r, combined with shot noise in the generated signal of electron counts. In that case the noise model 108, as a function of signal s, is known and can be described by the following equation:

$$n(s)=\sqrt{s+r^2} \quad (2)$$

In this specific case the discretized signal steps can be found either iteratively or using the integral form described with respect to equation (1). In either case, the result is described by the following equation:

$$s_k=\frac{1}{4}(kf)^2+kfr \quad (3)$$

Advantageously, equation (3) is an original expression not found in the literature and represents a new nonlinear scaling for this specific device (a CCD imaging sensor) and its noise model. As will be appreciated, the resulting steps of k in the signal dimension will start very small, with size determined by r, and will end with much larger steps at higher signal values due to shot noise following the noise model formula.

While the determination of a nonlinear output having constant uncertainty steps based on a noise model has been illustrated herein with respect to two examples: one having linear noise and one based on a CCD imaging sensor with a known noise model, it is understood that nonlinear steps can be determined iteratively or via direct integration using equation (1) for any sensor using arbitrary noise models (both user customized noise models and those pulled from the literature).

Figure 2:
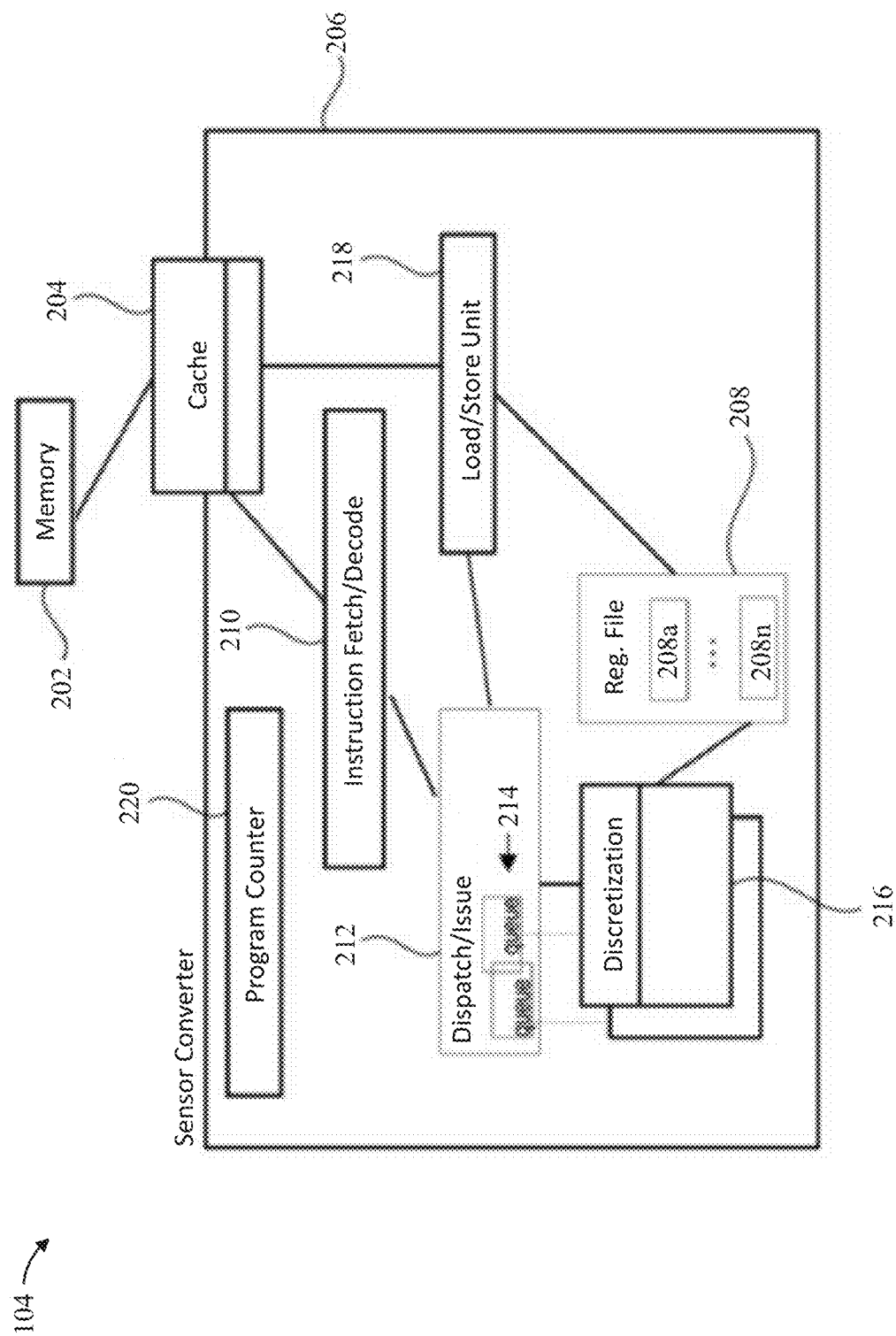
FIG. 2 is a block diagram illustrating an exemplary sensor converter according to a non-limiting embodiment of the invention.

FIG. 2 illustrates a detailed view of the sensor converter 104 shown in FIG. 1 in accordance with one or more embodiments. The sensor converter 104 can include a memory 202 and a cache 204 to enable storing data for performing operations on the stored data. According to an embodiment, one or more levels of the cache 204 of the sensor converter 104 can be employed to buffer memory data in order to improve processor performance. The cache 204 can include a high-speed buffer holding cache lines of memory data that are likely to be used. For example, typical cache lines can include 64, 128, or 256 bytes of memory data. According to an embodiment, the cache 204 can be configured to cache data of higher hierarchical storage, such as a main memory storage (e.g., memory 202).

In some embodiments of the invention, the sensor converter 104 includes a processor 206. The processor 206 can further include a register file 208 with registers 208a-n. The registers 208a-n can, for example, include general-purpose registers that each includes a number of bits to store data items processed by instructions executed in the processor 206.

According to an embodiment, the instructions can be provided by a compiler. For example, source code of a program can be compiled into a series of machine-executable instructions defined in an instruction set architecture ("ISA") associated with the sensor converter 104. The ISA can include at least one processor instruction for generating a nonlinear output with constant uncertainty steps as defined in accordance with at least one embodiment of the present disclosure. The instructions of the ISA can be provided to process data stored in memory 202 and/or in the registers 208a-n of the register file 208 of the processor 206. According to one embodiment, when the processor 206 starts to execute the executable instructions, these machine-executable instructions can be placed in order to be executed sequentially.

According to an embodiment, an instruction fetch/decode unit 210 can be employed to fetch placed instructions. For example, the instruction fetch/decode unit 210 can fetch the next sequential instructions, the target instructions of branch taken instructions, or the first instructions of a program following a context switch. The fetched instructions can be decoded by the instruction fetch/decode unit 210.

According to an embodiment, the decoded instruction(s) can be passed to a dispatch/issue unit 212. The dispatch/issue unit 212 can deposit the instructions in one or more issue queues 214, where the instructions can wait for source operands and a discretization module 216 of the processor 206 to become available. For example, the discretization module 216 can be associated with an issue queue 214 such that instructions to be executed by the discretization module 216 can be queued in the issue queue 214. In some embodiments of the invention, the discretization module 216 is configured to determine a nonlinear output having constant uncertainty steps based on an input noise model and an input signal as discussed previously herein.

The dispatch/issue unit 212 can deposit the instructions in an issue queue 214 based on an index that is assigned to the discretization module 216. This index can be part of the instructions. That is, by reading the index from an instruction, the dispatch/issue unit 212 can know (e.g., determine) that the discretization module 216 can execute the instruction.

According to an embodiment, each issue queue 214 can include window logic which can be responsible for monitoring dependencies between instructions in the queue and issuing instructions to the discretization module 216. The window logic can include wakeup logic and select logic. The wakeup logic can be responsible for invoking instructions waiting in the issue queue 214 for the source operands to become available. Once all the source operands of an instruction are available, the instruction can be flagged ready for execution. The select logic can be responsible for selecting instructions for execution from the pool of ready instructions. An instruction can be ready if all of its source operands are available. Then the operand values of the instruction can be loaded from the memory 202 and/or registers using a load/store unit 218.

According to an embodiment, a program counter (instruction counter) 220 can keep track of the address of the current instruction to be executed. For example, a program counter 220 in processor, such as, a z/Architecture® (z/Architecture and all IBM—based trademarks and logos are trademarks or registered trademarks of International Business Machines Corporation and/or its affiliates) processor can include 64 bits and can be truncated to 31 or 24 bits to support prior addressing limits. A program counter 220 can be embodied in a program status word ("PSW") of a computer such that it persists during context switching. In an embodiment, the program counter can be incremented by an amount equal to the number of bytes of the current instruction.

Figure 3:
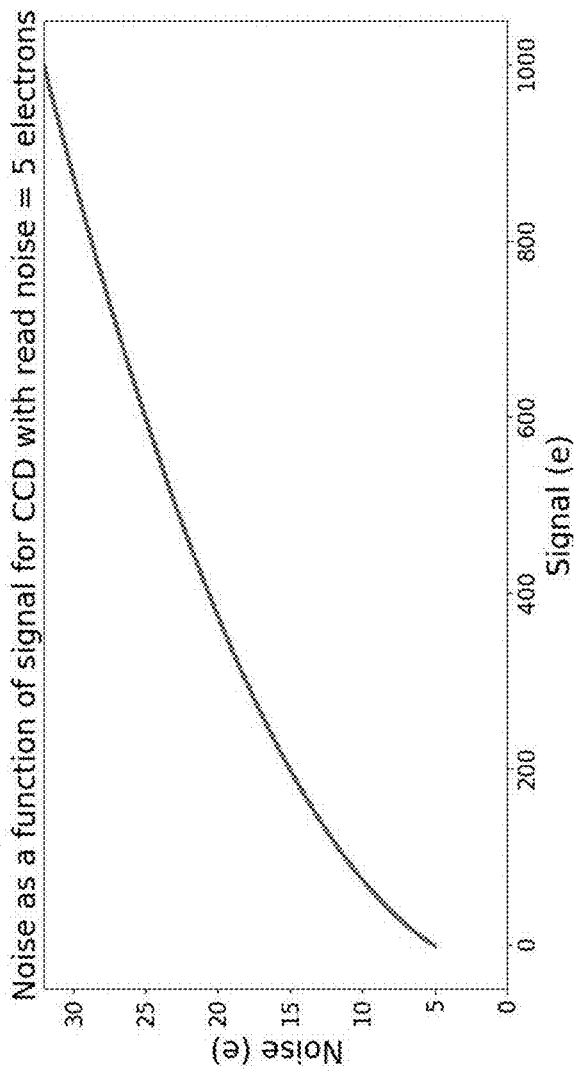
FIG. 3 depicts a graph of noise as a function of signal for a charge-coupled device (CCD) imaging sensor having a known noise model according to one or more embodiments according to one or more embodiments of the invention.

FIG. 3 illustrates a graph of noise as a function of signal for a CCD imaging sensor having a known noise model (as discussed previously in Example 2) according to one or more embodiments. As shown in FIG. 3, the read noise component is equal to about 5 electrons, meaning that when the signal (measured in electrons) is zero, the noise (measured in electrons) is about 5 electrons. In other words, the noise does not go to zero when the signal is zero. As further shown in FIG. 3, noise increases most rapidly as signal values increase between 0 and about 200 electrons. After about 400 electrons noise increases roughly linearly with increases in signal. It is understood that while FIG. 3 is shown for the specific noise model associated with CCD imaging sensors, the present invention can be applied to any device with a known noise model.

Figure 4:
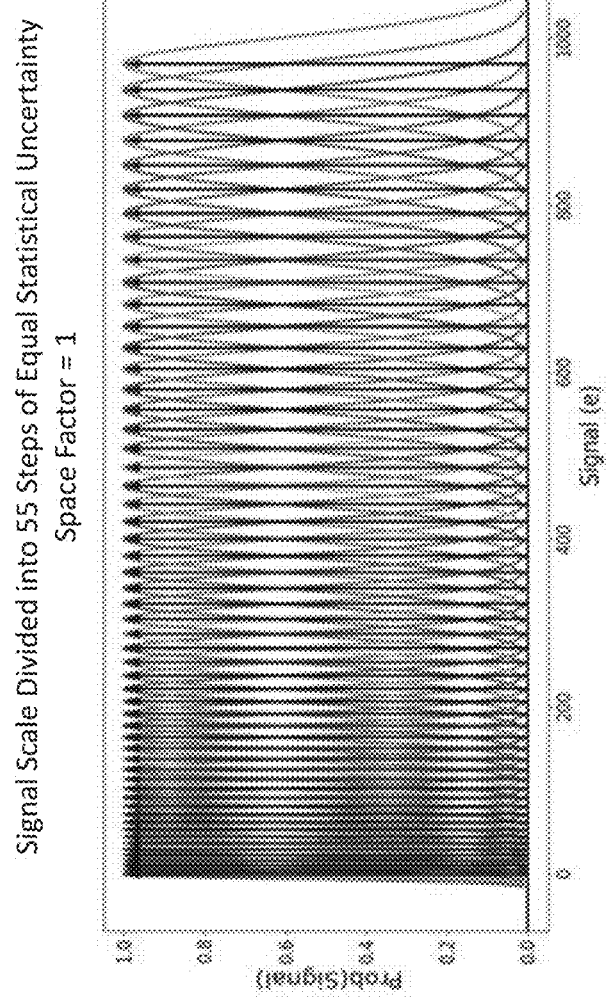
FIG. 4 depicts a discretized output having equal uncertainty signal steps based on a CCD noise model and a space factor of 1 according to one or more embodiments of the invention.
Figure 5:
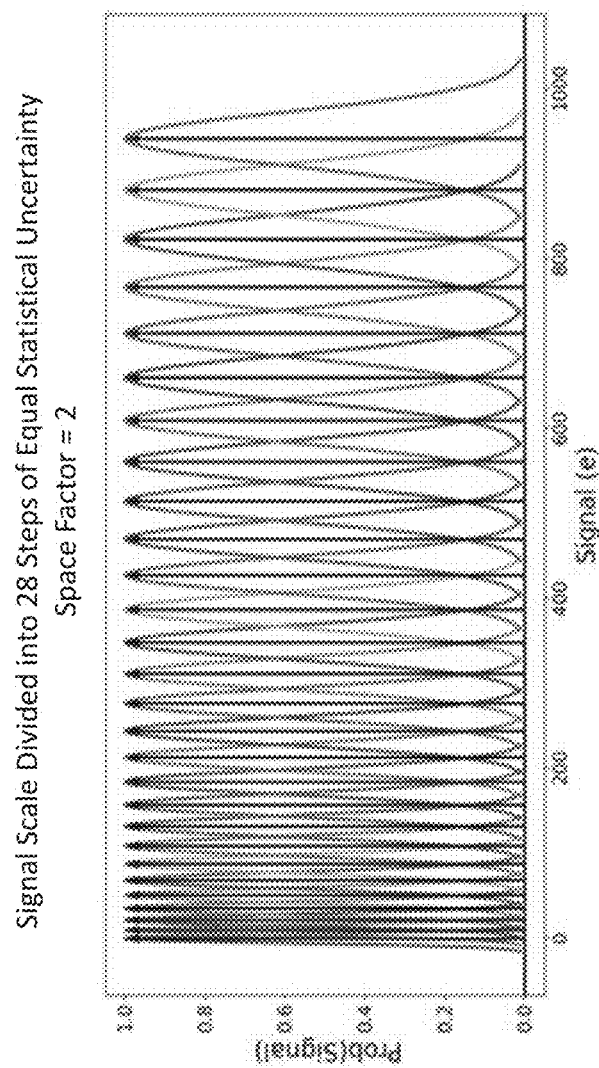
FIG. 5 depicts a discretized output having equal uncertainty signal steps based on a CCD noise model and a space factor of 2 according to one or more embodiments of the invention.
Figure 6:
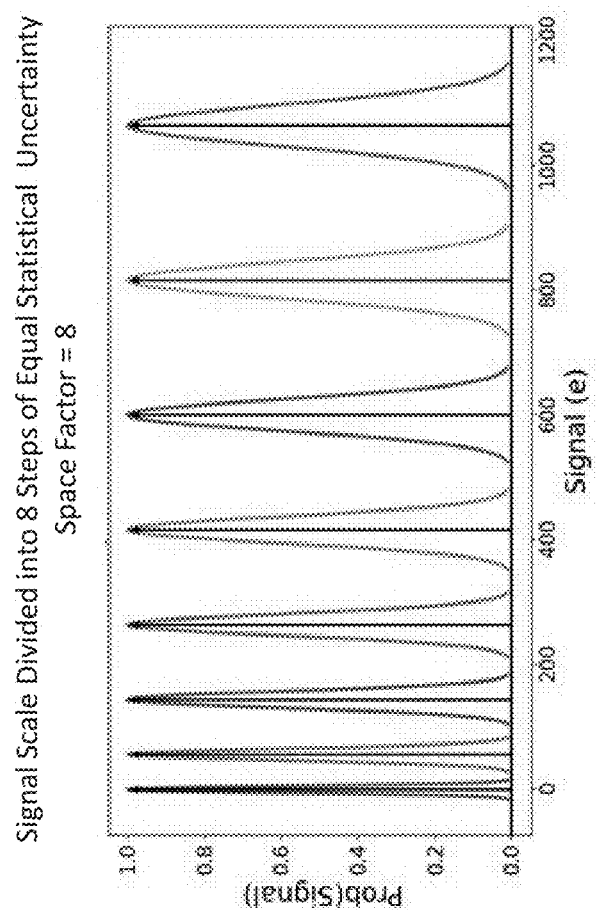
FIG. 6 depicts a discretized output having equal uncertainty signal steps based on a CCD noise model and a space factor of 8 according to one or more embodiments of the invention.

FIGS. 4, 5, and 6, depict equal uncertainty signal steps based on a CCD noise model for space factors of 1, 2, and 8, respectively, calculated according to one or more embodiments. In some embodiments of the invention, the equal uncertainty signal steps are determined iteratively. In some embodiments of the invention, the equal uncertainty signal steps are determined via direct integration. It is understood that, while FIGS. 4, 5, and 6 provide specific examples of discretized steps at space factors of 1, 2, and 8 for ease of discussion, the space factors are not limited to values of 1, 2, and 8. In fact, the space factors can be arbitrarily set depending on the degree of certainty desired between measurements in a given application. In other words, the space factor can be increased to improve the degree of certainty (i.e., the probability that adjacent steps are truly unique measurements). Conversely, the space factor can be decreased to provide a greater number of discretized steps at the expense of certainty between those steps.

As shown in FIG. 4, the statistical probability that a signal is distinct, prob(signal), is graphed against the incoming signal, measured in electrons, e. FIG. 4 depicts a space factor of 1, meaning that the resulting nonlinear scale includes steps separated by one standard deviation of statistical significance. The resulting discretized signal scale is divided into 55 steps having equal statistical uncertainty spanning a signal measured in electrons from zero to about 1000. In some embodiments of the invention, arrows (or peaks) represent the discrete steps and the Gaussian curve around each step represents the uncertainty in measurement at that signal level. As shown in FIG. 4, the widths of the Gaussian curves increase with signal and the spacing between distinct steps becomes farther apart. Consequently, more distinct steps are available at relatively low signals (e.g., between zero and 200 electrons) as compared to relatively higher signals (e.g., between 800 and 1000 electrons) when uncertainty is held constant.

FIG. 5 depicts a similar discretized scale based on a CCD noise model as that shown in FIG. 4, albeit with a spacing factor of two. At this spacing factor, the resulting nonlinear scale includes 28 steps separated by two standard deviations. Similarly, FIG. 6 depicts a discretized scale based on a CCD noise model with a spacing factor of eight. At this spacing factor, the resulting nonlinear scale includes eight steps separated by eight standard deviations. With FIG. 6 it is easy to see that as the signal increases, the width of the uncertainty curve at that point becomes wider—and that pushes the next discrete level farther up the scale.

Figure 7:
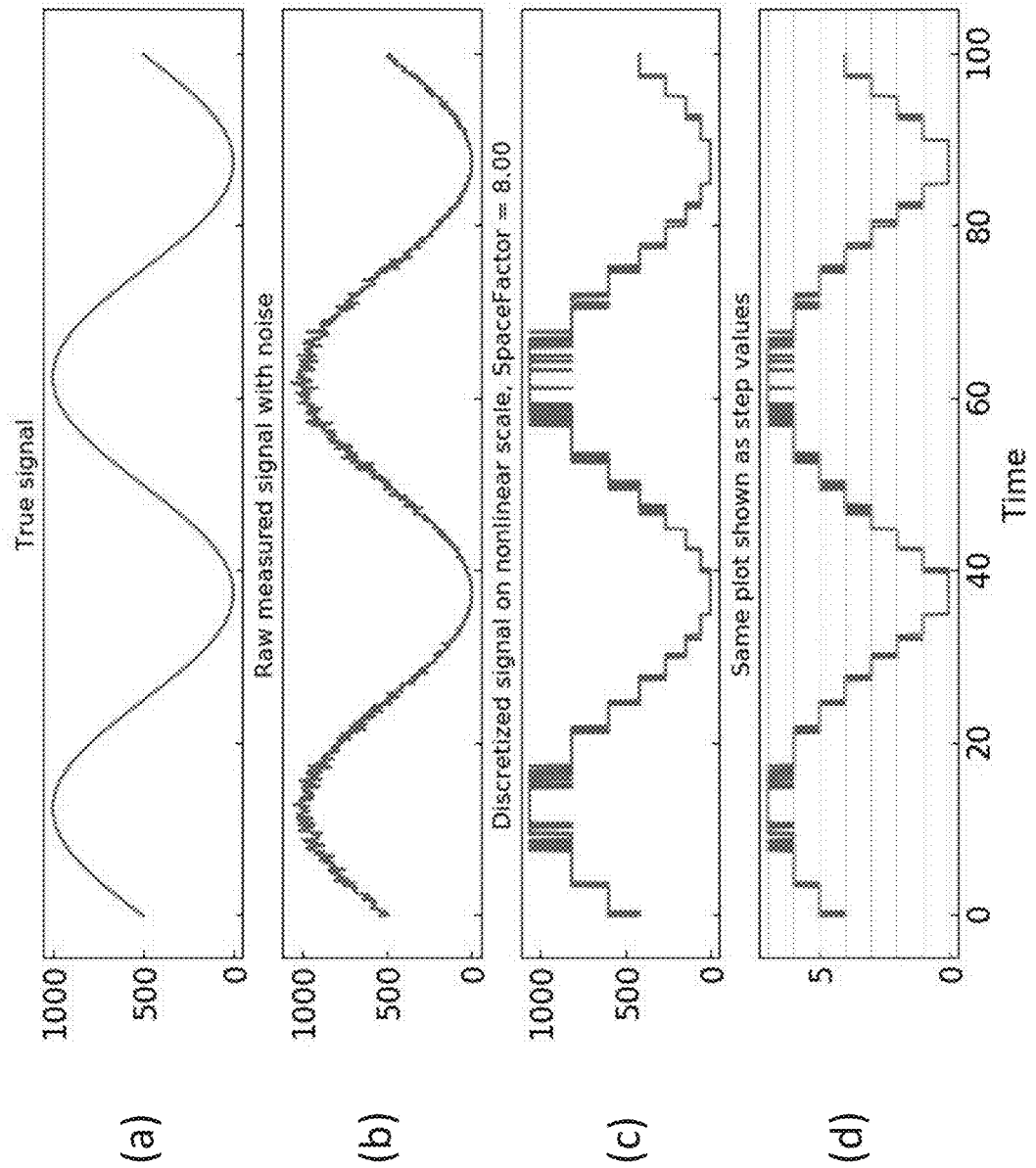
FIG. 7 depicts a nonlinear output after discretizing a signal into constant uncertainty steps according to one or more embodiments of the invention.

FIG. 7 depicts an exemplary nonlinear output (such as the nonlinear output 110 shown with respect to FIG. 1) after discretizing a signal into equal uncertainty steps according to one or more embodiments. In FIG. 7, graph (a) (the topmost curve) depicts a true signal measured over time (here, 0 to 100 seconds). Graph (b) (the second curve) depicts the sensor output at 1024 digital levels, including noise. In other words, graph (b) depicts the sensor measurements that are input into a sensor converter for discretization (e.g., sensor measurement 106 as shown in FIG. 1), as discussed previously herein. While 124 digital levels were chosen as an example for ease of illustration, it is understood that the sensor output can be provided at any number of arbitrarily chosen digital levels.

Graph (c) depicts a discretized output of the sensor measurements calculated iteratively or via direct integration of a noise model according to one or more embodiments. As shown in graph (c), the output values are mapped to discrete steps—each separated by constant uncertainty. Graph (d) depicts the actual integer levels of the steps determined in graph (c) as a unique output, i.e. as integer values from 0 to 7 in unit steps (corresponding to 8 steps of equal uncertainty and a space factor of 8). While a single example of graph (d) is provided for ease of illustration, it is understood that graph (d) will include a smaller or larger integer span depending on the spacing factor chosen. Continuing from the CCD imaging sensor example above, at a spacing factor of 1 the graph (d) would include integers ranging from 0 to 54, corresponding to the 55 discrete steps calculated for that scenario (see FIG. 4). A comparison for graphs (c) and (d) shows that while the shape of the curve will change when converting to integer steps, the same information is captured (i.e., the steps remain separated by equal uncertainties). Note in graph (d) that the number of possible values has been reduced to 8 "equally distinct" steps from 1024 digital levels without compromising the information captured. Advantageously, the reduction from 1024 digital levels to 8 steps represents a compression from 10 bits to only 3 bits. In this manner, discretizing a sensor output based on constant uncertainty can provide a unique data compression scheme.

Figure 8:
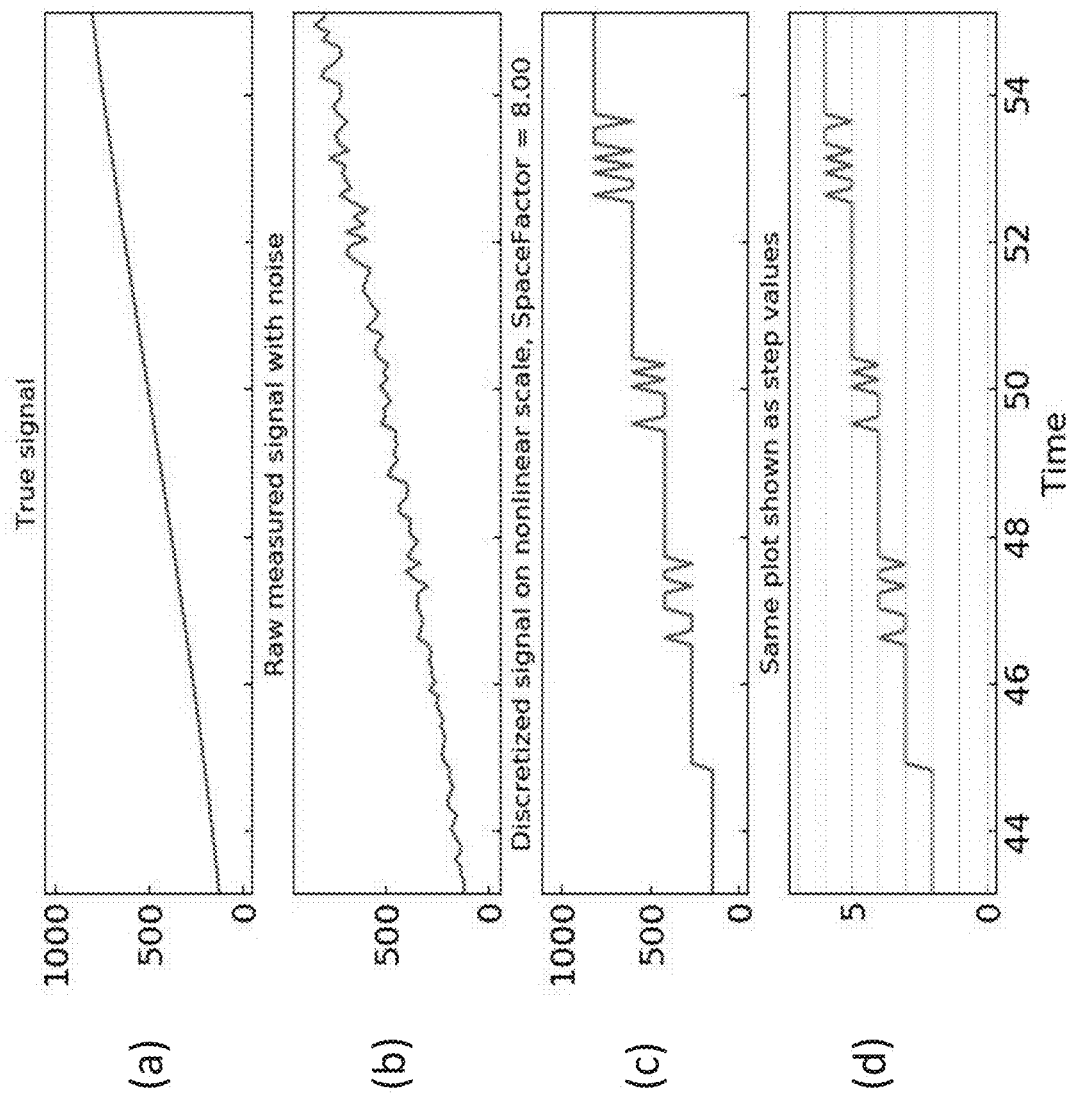
FIG. 8 depicts a nonlinear output after discretizing a signal into equal uncertainty steps according to one or more embodiments of the invention.

FIG. 8 depicts an alternative nonlinear output (such as the nonlinear output 110 shown with respect to FIG. 1) after discretizing a signal into equal uncertainty steps according to one or more embodiments. In some embodiments of the invention, FIG. 8 depicts a close-up of FIG. 7 (i.e., for signals between 44 and 54 seconds corresponding to the slope shown in graph (a) of FIG. 7 spanning 0 to 100 seconds) to better illustrate a detailed view of the graphs (c) and (d) as a result of discretization. Of note, instead of the plot wiggling up and down in small increments that have little statistical significance (as shown in the raw sensor output of graph (b)), graphs (c) and (d) of FIG. 8 depict discretized plots that only move a step up or down if the signal change represents a change backed by sufficient confidence. In other words, the discrete steps shown in graphs (c) and (d) are separated by uncertainty according to the chosen space factor (here, a space factor of 8).

Figure 9:
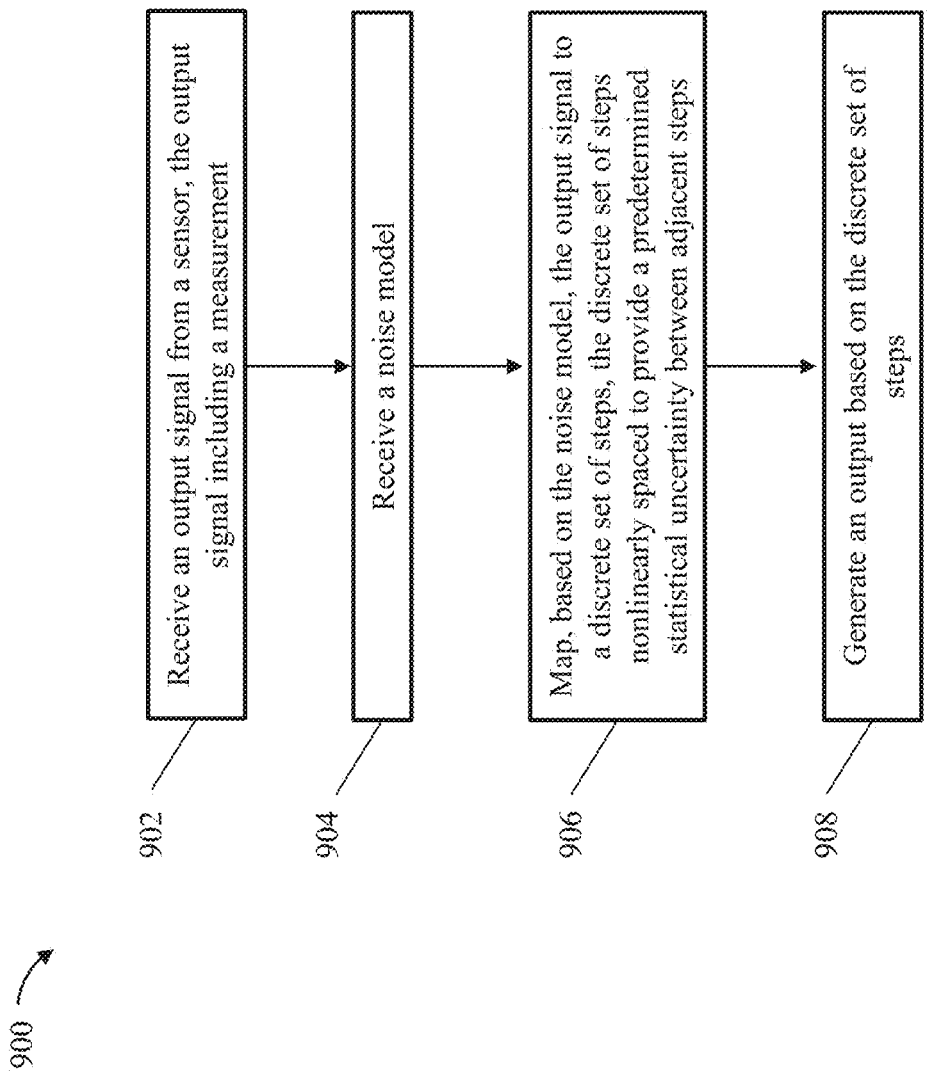
FIG. 9 depicts a flow diagram illustrating a method according to one or more embodiments of the invention.

FIG. 9 depicts a flow diagram 900 illustrating a method for providing a nonlinear, discretized scale with constant uncertainty steps according to one or more embodiments of the invention. As shown at block 902, an output signal from a sensor is received at a sensor converter. In some embodiments of the invention, the output signal includes a measurement. In some embodiments of the invention, the sensor includes one or more of an acoustic sensor, chemical sensor, electric current sensor, electric potential sensor, magnetic sensor, temperature sensor, pressure sensor, moisture sensor, flow sensor, radiation sensor, optical sensor, force sensor, thermal sensor, proximity sensor, and imaging sensor. In some embodiments of the invention, the sensor includes a CCD imaging sensor having a predetermined noise model.

At block 904, the sensor converter receives a noise model. In some embodiments of the invention, the noise model is a noise model of the sensor or a noise model of an external data source communicatively coupled to the sensor. The noise model can be provided manually or automatically. For example, in some embodiments of the invention, the noise model is provided by the sensor. In other embodiments, the noise model can be manually loaded to the sensor converter. For example, a user interface can be provided that is configured to allow a user to manually upload noise models to the sensor converter. The user interface can also or alternatively allow a user to select from a list of preconfigured noise models.

In some embodiments of the invention, the noise model includes a formula configured specifically for the sensor to estimate an amount of noise present in the measurement made by the sensor. In some embodiments of the invention, the noise model is one-dimensional and nonlinear.

At block 906, the output signal is mapped, based on the noise model, to a discrete set of steps. In some embodiments of the invention, the discrete set of steps are nonlinearly spaced to provide a predetermined uncertainty between adjacent steps. In some embodiments of the invention, the predetermined uncertainty is constant uncertainty. In some embodiments of the invention, the predetermined uncertainty is configured to dynamically change between successive pairs of steps.

In some embodiments of the invention, mapping the output signal to a discrete set of steps includes determining the discrete set of steps iteratively. In some embodiments of the invention, mapping the output signal to a discrete set of steps includes determining the discrete set of steps by integration of the noise model. In some embodiments of the invention, mapping the output signal to a discrete set of steps comprises determining a space factor that defines a required number of standard deviations of certainty between adjacent steps.

At block 908, an output based on the discrete set of steps is generated by the sensor converter.

As can be seen from the foregoing detailed descriptions, technical effects and benefits of embodiments of the invention provide a new sensor converter and methods of using the same to map an output measurement from a sensor to a discrete set of steps optimized to have constant uncertainty between them. The present sensor converter can be used to improve a wide variety of applications, for example, to enable an entirely new type of data compression—one based on constant uncertainty steps that is unique to the noise model of a particular application.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Similarly, the term "coupled" and variations thereof describes having a communications path between two elements and does not imply a direct connection between the elements with no intervening elements/connections between them. All of these variations are considered a part of the specification. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

Spatially relative terms, e.g., "beneath," "below," "lower," "above," "upper," and the like, are used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (e.g., rotated 90 degrees or at other orientations), and the spatially relative descriptors used herein should be interpreted accordingly.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   receiving, at a sensor converter, an output signal from a sensor, the output signal comprising a measurement;
   receiving, at the sensor converter, a noise model;
   mapping, based on the noise model, the output signal to a discrete set of steps, the discrete set of steps nonlinearly spaced to provide a predetermined statistical uncertainty between adjacent steps; and
   generating, by the sensor converter, an output based on the discrete set of steps.

2. The computer-implemented method of claim 1, wherein the sensor comprises one or more of an acoustic sensor, chemical sensor, electric current sensor, electric potential sensor, electric field sensor, magnetic field sensor, temperature sensor, pressure sensor, moisture sensor, flow sensor, radiation sensor, optical sensor, force sensor, thermal sensor, proximity sensor, and imaging sensor.

3. The computer-implemented method of claim 1, wherein the sensor comprises a charge-coupled device (CCD) imaging sensor having a predetermined noise model.

4. The computer-implemented method of claim 3, wherein the noise model is one-dimensional and nonlinear.

5. The computer-implemented method of claim 1, wherein the noise model comprises a formula configured specifically for the sensor to estimate an amount of noise present in the measurement made by the sensor.

6. The computer-implemented method of claim 1, wherein mapping, based on the noise model, the output signal to a discrete set of steps comprises determining the discrete set of steps iteratively.

7. The computer-implemented method of claim 1, wherein mapping, based on the noise model, the output signal to a discrete set of steps comprises determining the discrete set of steps by integration of the noise model.

8. The computer-implemented method of claim 1, wherein mapping the output signal to a discrete set of steps comprises determining a space factor that defines a required number of standard deviations of certainty between adjacent steps.

9. The computer-implemented method of claim 8 further comprising compressing the output signal based on the space factor.

10. A processing system comprising:
    an instruction fetch/decode unit operable to fetch and decode a plurality of instructions comprising at least one instruction to perform a discretization operation;
    a dispatch/issue unit operable to dispatch the instructions to an issue queue after decoding; and
    a discretization module communicatively coupled to the issue queue, the discretization module configured to perform a plurality of operations comprising:
       receiving an output signal from a sensor, the output signal comprising a measurement;
       receiving a noise model of the sensor;
       mapping, based on the noise model, the output signal to a discrete set of steps, the discrete set of steps nonlinearly spaced to provide constant statistical uncertainty between adjacent steps; and
       generating an output based on the discrete set of steps.

11. The processing system of claim 10, wherein the noise model comprises a formula configured specifically for the sensor to estimate an amount of noise present in the measurement made by the sensor.

12. The processing system of claim 10, wherein mapping, based on the noise model, the output signal to a discrete set of steps comprises determining the discrete set of steps iteratively.

13. The processing system of claim 10, wherein mapping, based on the noise model, the output signal to a discrete set of steps comprises determining the discrete set of steps by integration of the noise model.

14. The processing system of claim 10, wherein mapping the output signal to a discrete set of steps comprises determining a space factor that defines a required number of standard deviations of certainty between adjacent steps.

15. A computer program product comprising a computer readable storage medium having program instructions embodied therewith, the program instructions executable by processing circuitry to perform a plurality of operations comprising:
    receiving an output signal from a sensor, the output signal comprising a measurement;
    receiving a noise model of the sensor;
    mapping, based on the noise model, the output signal to a discrete set of steps, the discrete set of steps nonlinearly spaced to provide constant statistical uncertainty between adjacent steps; and
    generating an output based on the discrete set of steps.

16. The computer program product of claim 15, wherein the noise model comprises a formula configured specifically for the sensor to estimate an amount of noise present in the measurement made by the sensor.

17. The computer program product of claim 15, wherein the noise model is one-dimensional and nonlinear.

18. The computer program product of claim 15, wherein mapping, based on the noise model, the output signal to a discrete set of steps comprises determining the discrete set of steps iteratively.

19. The computer program product of claim 15, wherein mapping, based on the noise model, the output signal to a discrete set of steps comprises determining the discrete set of steps by integration of the noise model.

20. The computer program product of claim 15, wherein mapping the output signal to a discrete set of steps comprises determining a space factor that defines a required number of standard deviations of certainty between adjacent steps.

* * * * *